United States Patent [19]

Shroyer

[11] Patent Number: 5,787,316
[45] Date of Patent: Jul. 28, 1998

[54] METHOD OF SETTING BIT CELL LENGTH FOR MAGNETIC RECORDING OF DATA IN A PHOTOGRAPHIC CAMERA

[75] Inventor: Richard A. Shroyer, Rochester, N.Y.

[73] Assignee: Eastman Kodak Company, Rochester, N.Y.

[21] Appl. No.: 835,248

[22] Filed: Apr. 7, 1997

[51] Int. Cl.$^6$ ............................................. G03B 17/24
[52] U.S. Cl. ........................................................ 396/319
[58] Field of Search .................................. 396/310, 311, 396/315, 319, 320

[56] References Cited

U.S. PATENT DOCUMENTS

| | | | |
|---|---|---|---|
| 4,977,419 | 12/1990 | Wash et al. | 396/319 |
| 5,294,949 | 3/1994 | Robinson et al. | 396/319 |
| 5,311,228 | 5/1994 | Stoneham et al. | 396/315 |

*Primary Examiner*—Safet Metjahic
*Assistant Examiner*—Nicholas J. Tuccello
*Attorney, Agent, or Firm*—Francis H. Boos, Jr.

[57] ABSTRACT

A method of setting recorded data bit cell length on an APS film magnetic layer in a camera of the type having apparatus for normally setting bit cell length as a function of measured film transport velocity. The method comprises detecting the occurrence of an invalid film velocity measurement and substituting a default data recording frequency that results in a recorded bit cell length on the film which ensures that a maximum number of intended data bits are recorded in a given available length of data track which might otherwise not result if the invalid film velocity measurement were used to set the recorded bit cell length. Determination of invalid velocity measurement can be made by sensing mispositioned film in the film gate at the start of film advance, for example by detecting alignment of a perf used for velocity measurement with the velocity determining optical sensor or by detecting a delay time between start of film advance and velocity perf detection that is less than a minimum threshold delay amount associated with normal film position. Alternatively, actual film velocity may be measured and a default bit cell length set when the measured velocity is outside a range of measured velocities associated with normal film advance operation.

9 Claims, 3 Drawing Sheets

5,787,316

METHOD OF SETTING BIT CELL LENGTH FOR MAGNETIC RECORDING OF DATA IN A PHOTOGRAPHIC CAMERA

FIELD OF THE INVENTION

This invention relates to the field of photographic cameras having magnetic data recording apparatus for recording of data on magnetic recording layers formed on photographic film. More specifically, it relates to data recording in a camera in which film velocity is determined and a selectable bit cell length is set in response to the determined film velocity.

BACKGROUND OF THE INVENTION

The recently introduced Advanced Photography System (APS) provides the capability of magnetic recording data on a magnetic layer formed on the opposite side of the film base from the emulsion layer. Specifications for the system dictate a predetermined length for a recording track adjacent each image frame that is of a finite maximum length. The data is redundantly recorded (three times) within the available track length in order to enhance the reliability of subsequent error free reading the data. The data signal format used comprises a pulse position modulation signal as shown in FIG. 1, in which each "1" or "0" data bit DB is indicated by its relative position within a bit cell CL framed by clock pulses CP. When recorded on the film magnetic layer, the length between clock pulses ("bit cell length") is determined by a number of variables including the data recording frequency, i.e. clock pulse frequency and film transport velocity during recording. Film velocity can be highly variable, depending on such factors as ambient temperature, frame number (i.e. location of the frame within the film strip) and battery condition. Thus, in order to ensure recording of necessary data within the available standard track length, it is known to provide means for sensing film velocity and means responsive to the sensed film velocity for adjusting the data recording frequency to provide a bit cell length in the recorded data signal that comes within an acceptable range of bit cell lengths. Film velocity can be detected by electromechanical encoder means in the camera or, more preferably, by means of an optical sensor. In this latter arrangement, an optical sensor is spaced from a reference perforation ("perf") on the film when the film frame is properly positioned in the camera film gate as shown in FIG. 2. This optical sensor is capable of accurately sensing the presence of the perf at the start of frame advance initiated after an image capture is completed. The time it takes for the optical sensor to detect the leading and trailing edges of the perf as it passes through the detection zone of the optical sensor is used as a measure of the velocity of the film transport system. This perf time measurement may be used to access a lookup table to produce an output related to bit cell time that is then applied to the data encoder in the camera to adjust the data recording frequency to achieve the desired bit cell length on the recorded track. The lookup table is structured such that, for short perf times (high velocity), the bit cell time is short and for long perf times (low velocity), the bit cell time is long, the effect of this operation is to minimize variation in the physical bit cell length in the recorded track on the film.

Such an arrangement works quite well so long as the film velocity is accurately determined. If, however, the perf time measurement is invalid, the bit cell length may vary substantially from nominal. In the extreme, the recorded bit cell length can become too short to be reliably read or so long that the expected number of bits cannot be written within the specified maximum track length. In the event of a film metering failure during film advance that results in improper positioning of the film in the film gate, the anticipation perf may be positioned closer the optical sensor than would normally be expected. The perf time measurement may then become invalid because the film transport is not up to speed at the time the velocity measurement is made. In such a case, the perf time measurement will be high (low film transport velocity), resulting in a long bit cell time. When the film transport reaches its nominal velocity during the ensuing frame advance, an excessively long bit cell would result causing the most serious error of failure to write all of the bits within the available maximum track length.

There is therefore a need for a method of accommodating situations in which perf time measurement is invalid due to mis-positioning of the film in the film gate and for ensuring that the data is recorded at a suitable bit cell length in such an event.

SUMMARY OF THE INVENTION

In accordance with the invention, therefore, there is provided a method of setting bit cell time for magnetic recording of a digital data signal in a predetermined length of recording track on photographic film strip within a camera, the data signal having up to a preselected maximum number of data bits, and the camera having apparatus for measuring film transport velocity upon initiation of film advance and for setting a bit cell length in response to said measured velocity. The method comprises the steps of initiating film advance after capture of an image on the film, sensing, during an initial stage of film advance, a condition related to film advance which is indicative that said measured film transport velocity is invalid for use in setting bit cell length for data recording; and setting a default bit cell length when said sensed condition indicates said measured film transport velocity is invalid for use in setting bit cell length, said default bit cell length being sufficiently short to ensure recording of all the data signal in said predetermined length of recording track for a predefined maximum film transport velocity.

This and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
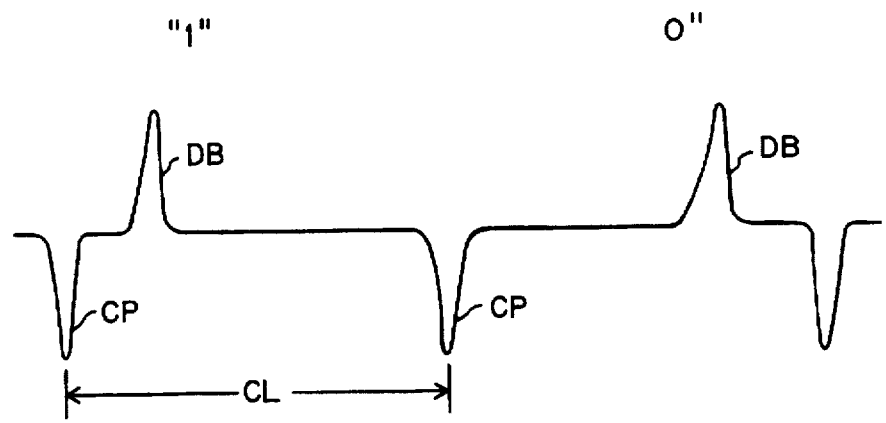
FIG. 1 is signal diagram illustrated the format of an APS digital signal to be recorded on a magnetic layer formed on APS photographic film.
Figure 2:
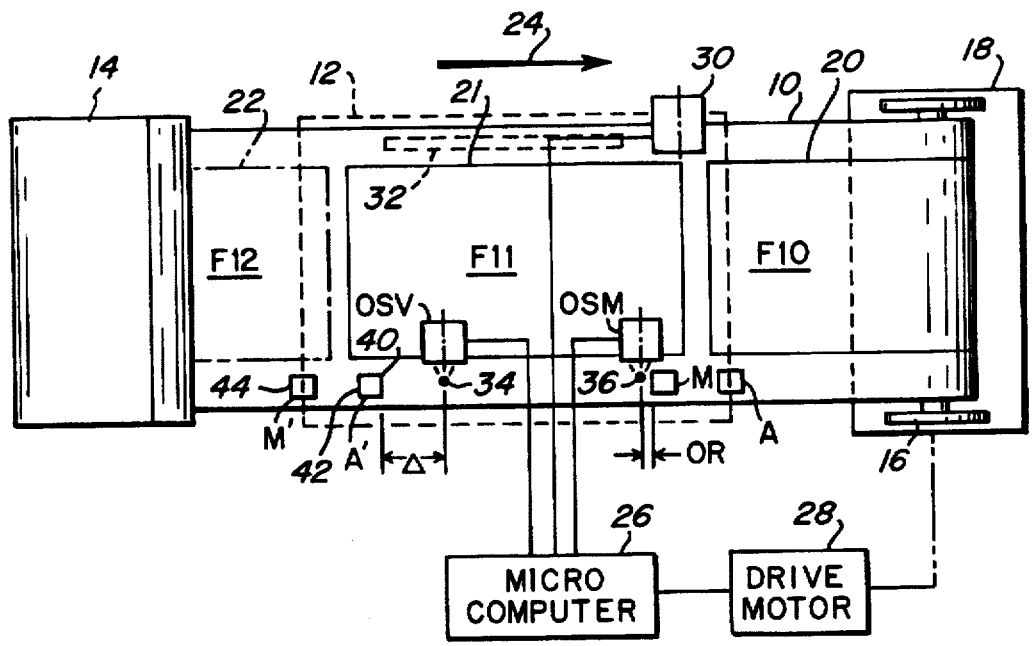
FIG. 2 is a schematic diagram of camera apparatus used for recording of digital data signals on film in an APS camera.

Referring now to FIG. 2, an APS film strip 10 is shown spanning a camera film gate 12 from a film cartridge 14 to a takeup spool 16 in a film receiving chamber 18. Solid lines 20, 21 represent latent image frames F10 and F11, respectively, captured on the film 10 during previous picture taking sequences. Dash-dot line 22 indicates the next available image frame area F12 to be positioned in the film gate 12 as a consequence of a film frame advance operation which advances the film in the direction of arrow 24. In a normal wind camera, as indicated in the drawing, frame advance is initiated by camera microprocessor 26 at the conclusion of a picture taking sequence by activating a film drive motor 28 to rotate takeup spool in the winding direction. In the prewind type of camera, frame advance would occur in the reverse direction with film being rewound frame by frame into the film cartridge 14. During the frame advance operation, a magnetic recording head 30 records data in a magnetic data track 32 located adjacent to the frame F11 in which an image had just been captured. Optical sensors OSV and OSM detect film perfs A and M by sensing the leading and trailing edges of the perfs as they pass through the respective sensing regions 34 and 36. Optical sensor OSM serves a film metering function to position the next available image frame F12 in the film gate 12. For example, during metering of frame F11 into position in the film gate 12, as the film strip 10 is advancing to the right, sensor OSM detects perf A ("anticipation perf") to the right of frame F11 causes microprocessor 26 to begin slowing down the motor drive in anticipation of the arrival of the following perf M ("metering perf"). When the leading edge of perf M is sensed by sensor OSM, microprocessor 26 causes a braking action to be applied to the motor drive forcing the film to stop with a slight amount of overrun OR between the sensing region 36 of sensor OSM and the trailing edge of metering perf M. Typically, this overrun is in the range of 1.0 mm. When metered in this manner, the film strip is stopped with frame F11 properly positioned in the film gate 12.

Timing of initiation of the recording of data during the frame advance operation following capture of an image on frame F11 is controlled by optical sensor OSV. Sensor OSV is also used to detect the film transport velocity to establish the data recording frequency which, in turn, controls the physical bit cell length of the data recorded in magnetic data track 32. These operations occur in the following manner. Sensor OSV is positioned within the camera film gate 12 such that when the film frame is properly positioned in the film gate, there is a predetermined spacing Δ between the sensing region 34 of sensor OSV and the leading edge 40 of perf A' associated with the next available image frame F12. This threshold spacing is empirically determined to provide enough time for a properly positioned film to accelerate up to a stable film transport velocity by the time the leading edge 40 of perf A' reaches the sensing region of sensor OSV. A typical value for Δ is 7.0 mm. At the conclusion of a picture taking sequence in which an image is captured in image frame F11, microprocessor 26 activates motor drive 28 to advance the film to the next available film frame F12. As perf A' passes through sensor region 34, sensor OSV detects the leading and trailing edges 40, 42 of the perf and microprocessor 26 measures the time duration between detection of the two edges. This time measurement is then applied to a lookup table such as that shown in Table I to obtain a data recording frequency that will achieve an appropriate physical bit cell length on the recorded track.

TABLE I

| Perf Time Measurements | Bit Cell Time |
| --- | --- |
| <= 19 msec | 351 μsec |
| 20–22 msec | 377 μsec |
| 23–25 msec | 421 μsec |
| 26–28 msec | 471 μsec |
| 29–31 msec | 527 μsec |
| 32–34 msec | 588 μsec |
| 35–37 msec | 655 μsec |
| 38–40 msec | 724 μsec |
| 41–43 msec | 794 μsec |
| 44–46 msec | 858 μsec |
| 47–53 msec | 925 μsec |
| 54–60 msec | 1000 μsec |
| 61–66 msec | 1080 μsec |
| >= 67 msec | 1165 μsec |

As the film continues its advance, sensor OSV detects the trailing edge 44 of perf M' which causes the commencement of data recording in track. As the film nears its new position at the end of the frame advance operation, sensor OSM detects the trailing edge 42 of perf A' which causes microprocessor 26 to terminate the recording of data at the end of track 32. It can be seen from this description that data track 32 has a maximum recording length that is predetermined by the invariant physical positions of optical sensors OSV and OSM irrespective of the film transport velocity during the film advance. The maximum number of bits that can be recorded, however, is limited by the film transport velocity and the data recording frequency which determines the physical bit cell length recorded in the track. Thus, knowledge of the film transport velocity is important in selecting a data recording frequency that will set the bit cell length within a range of acceptable bit cell lengths that will achieve the dual objectives of providing readable data (in the case of recording at low film transport velocity) and the maximum amount of data bits intended to be recorded in the available length of data track 32 (in the case of recording at high film transport velocity).

Figure 3:
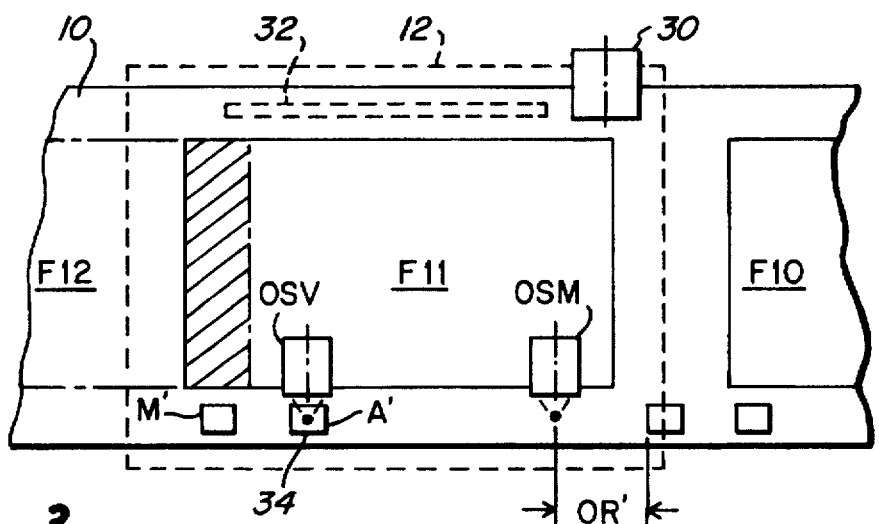
FIGS. 3 and 4 are schematic diagrams illustrating improper positioning of film in an APS camera film gate prior to initiating a film advance and data recording operation.
Figure 4:
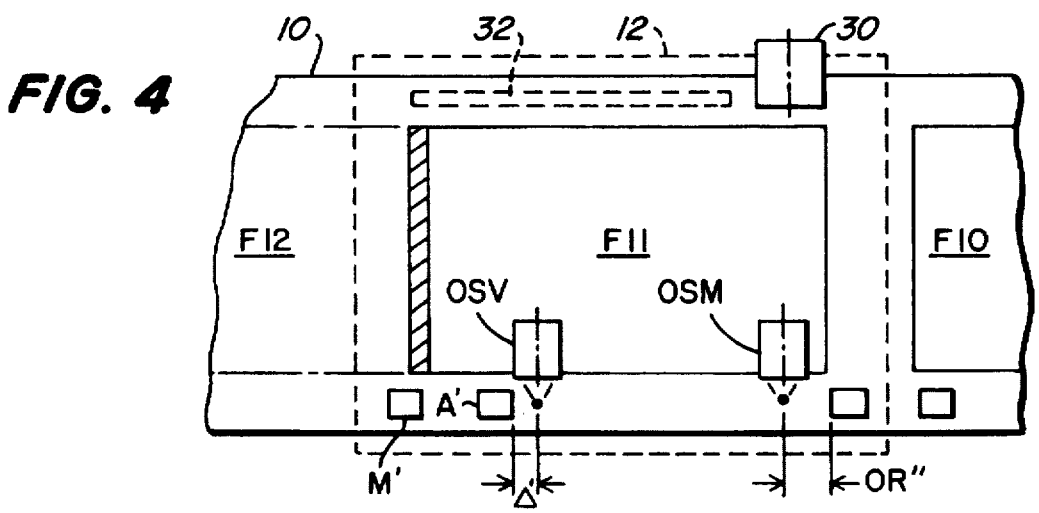

In a camera provided with film transport velocity sensing apparatus as described above, the measuring velocity is used to select a recording frequency that sets the recorded bit cell length recorded on the film at the desired length or within an acceptable range of bit cell lengths. However, it has been found that certain camera conditions can exist that will cause the measured film transport velocity to be invalid thus setting a bit cell length which does not achieve the desired objectives. Mis-positioning of the film frame area within the film gate is one such condition. Mis-positioning can occur as a result of an error in the metering operation which results in the overrun OR being substantially more than the 1.0 mm or so considered to be normal. FIGS. 3 and 4 show two possible conditions of film mis-positioning in the film gate 12. FIG. 3 shows a condition in which a substantial overrun OR' has occurred at the end of a previous film metering operation (frame advance) resulting in the perf A' being aligned directly under the sensor OSV. In FIG. 4, a less severe condition is shown in which an overrun OR" has occurred which is significantly greater than the acceptable overrun OR of FIG. 2 resulting in a significantly smaller spacing Δ' between perf M' and sensor OSV than would be the case if the film were properly positioned in the film gate. While, as just described, such mis-positioning can result from erroneous overrun at the end of a metering operation, it can also result from a failure of the camera to hold the film in its metered position when the camera is suddenly jolted such as might occur the camera is dropped. In either illustrated case of mis-positioning, an invalid perf time measurement will result and, in accordance with the invention, the actual time measurement is discarded and a default bit cell length is set by selecting a data recording frequency that is associated with a nominal film transport velocity. In the case of the condition illustrated in FIG. 3, when sensor OSV is activated at the beginning of the film advance operation, a maximum signal output from sensor OSV indicates that the perf is aligned with the sensor. This can be immediately interpreted by microprocessor 26 to override any attempt to measure the time of passage of the perf through the sensing region (since the leading edge of the perf A' would not be detected) and to cause selection of a default bit cell length. In the case of a less severe positioning error as illustrated in FIG. 4, an invalid time measurement is determined by measuring the time interval between the beginning of the frame advance cycle and the time of the first sensing (leading edge) of the anticipation perf A'. This time is then compared to a threshold time value which would normally be expected for the leading edge of perf A' to reach the sensing region 34 in normal operation for a usual range of operating conditions and, if less than that threshold, the measured velocity is ignored and the default bit cell length is set. Choosing a relatively short bit cell length within the normal range of bit cell lengths provides the highest likelihood of the recording of a readable bit cell since the worst case condition is the one in which the bit cell is too long for the actual film transport velocity resulting in the inability of recording the desired maximum number of bits on the available track length. Based on the bit cell Table I, an appropriate default bit cell time would be approximately 400 μsec.

Figure 5:
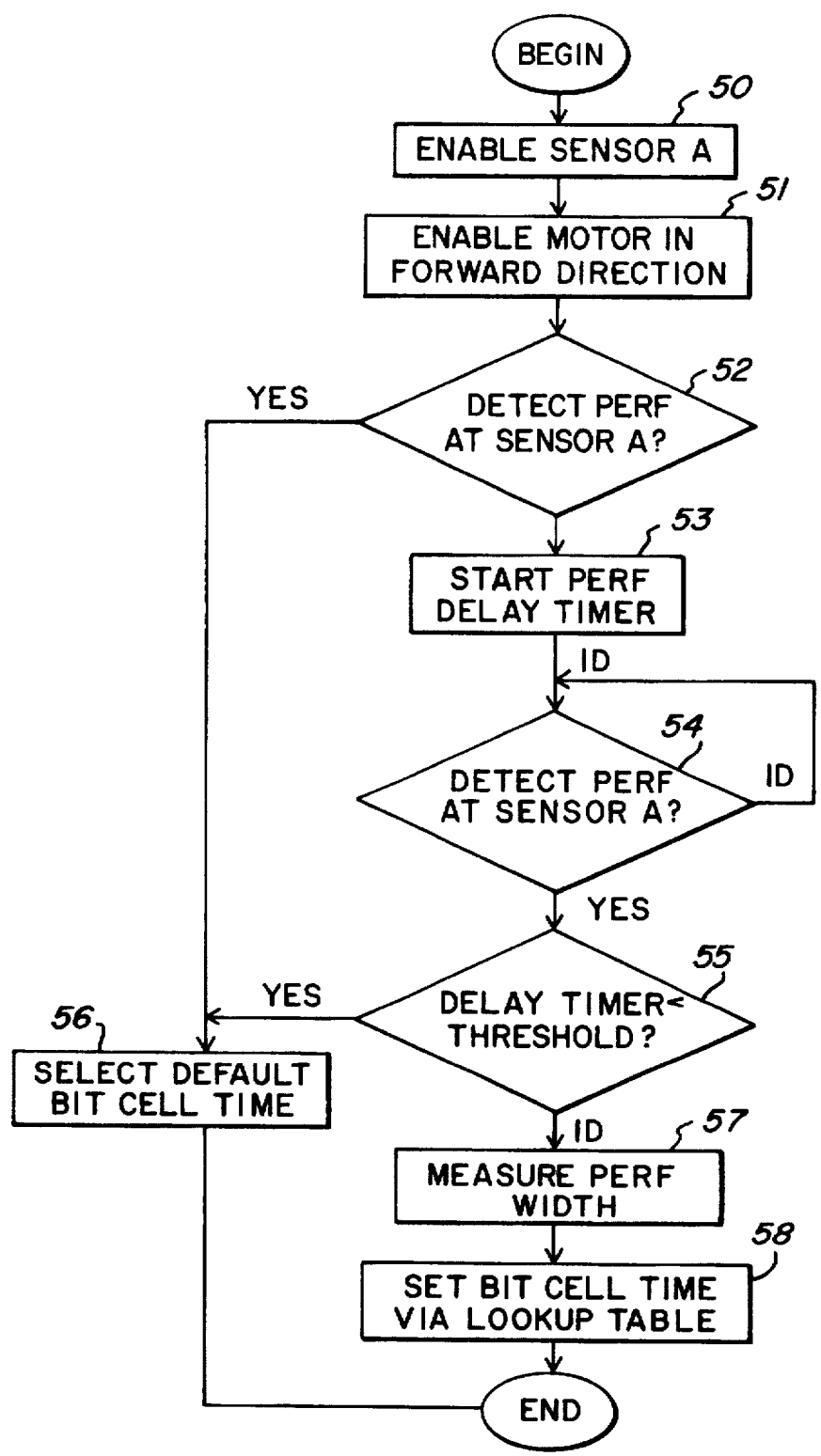
FIG. 5 is a program flow chart illustrating the manner in which a camera microprocessor can be programmed to perform the method of the invention using sensing of the position of a reference film perforation as an indicator of improper positioning of the film in the camera film gate.

Referring to FIG. 5, there is shown a program flow chart which illustrates a representative manner in which a camera microprocessor can be programmed to carry out the method of the invention. After capture of an image on a film frame area (F11) in film gate 12, film frame advance begins by enable sensor OSV in step 50 and enabling the drive motor 28 at step 51 in the forward or film frame advance direction. At the time of initial start up query 52 determines if perf A' is aligned with sensor OSV indicating a severe case of mis-positioning. In this event, the program immediately branches to step 56 which causes the default bit length to be selected for recording on the film. If the perf is not aligned with the sensor, step 53 causes a perf delay timer to be started. Query 54 recycles until the leading edge of perf A' is detected whereupon query 55 then tests the delay time to see if it is less than a predetermined minimum threshold value indicative of a boundary condition of the position of the film in the film gate. If affirmative, indicating a significant mis-position condition, the program branches to step 56 to cause the default bit cell time to be recorded on the film. However, if the test is negative, indicating acceptable positioning of the film, the program proceeds to steps 57 and 58 for normal measurement of the perf width (time) and setting of the bit cell length via the lookup table in microprocessor memory as described above.

A representative manner in which a suitable minimum threshold value of delay time can be determined is to test a representative sample of cameras under conditions of maximum temperature and fresh batteries (since this would result in the shortest bit cell times for normal operation with properly positioned film). The minimum threshold can then be calculated as the time which is six standard deviations less than the nominal time for this population.

A camera's film transport velocity profile is substantially dependent on several parameters and the threshold value can then be calculated as a function of any of these parameters or any combinations of the parameters, such that a camera that is provided with apparatus capable of sensing the value of any of these parameters could use the more accurate threshold calculated from the sensed parameter values rather than from a single, universal threshold. For example, the film transport velocity profile is known to be dependent on the relative location of the frame area in question within the overall film roll due to the growing diameter of the film on the takeup reel. This frame location can be determined by knowing the number of the frame in the film gate and the overall length of the film roll. Through empirical tests, the elapsed time measurements can be sorted according to these two parameters and a separate threshold value created for each population of film rolls (by roll length as indicated by the total number of available exposures). In a camera which reads the number available exposures in a roll, e.g. from DX information on the cartridge or from a data disk on the film cartridge and maintains a current frame count, the appropriate threshold value could be used for each frame advance by accessing a corresponding lookup table maintained in microprocessor memory. Similarly, threshold values of elapsed time measurements can be established by empirical testing and sorted into lookup tables according to temperature or battery voltage parameters. During normal camera operation, actual measured elapsed perf time measurements can then be referenced to such lookup tables associated with either or both of these parameters. Thus in a camera equipped with a temperature sensor and/or battery voltage monitoring circuit the actual measured value can be referenced to the appropriate temperature and/or battery voltage parameter lookup table for comparison with the corresponding threshold value in determining valid or invalid film velocity measurement.

Figure 6:
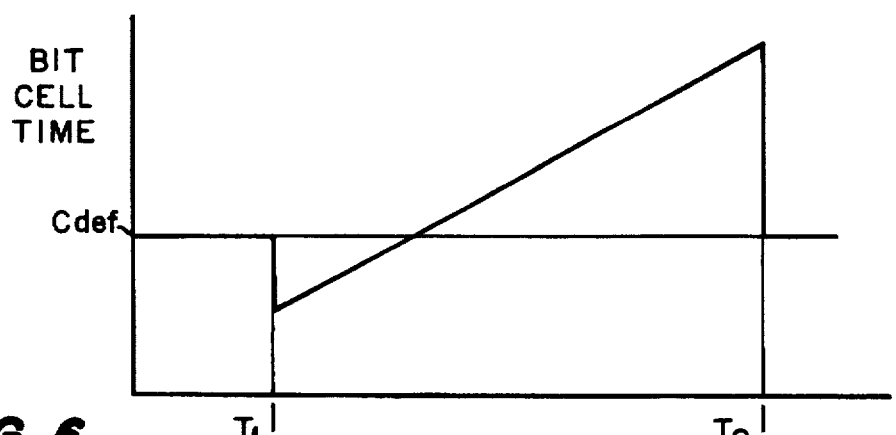
FIG. 6 is graph of sensed film transport velocity versus bit cell length illustrated a possible application of the invention to the sensing of film transport velocity as an indicator of improper positioning of the film in the film gate.

An alternative method of selecting default bit cell table in the event of a prior metering failure would be implemented by utilizing a bit cell time lookup table similar to the one shown in Table I but which is based on the perf time measurement graph shown in FIG. 6 showing by solid line 60 the relationship of measured perf time to bit cell time. As shown in this graph, if the perf time measurement 60 falls within an acceptable range of perf time measurements $T_1$ to $T_2$, the corresponding value of bit cell time is employed as determined by the graph. However, if the detected perf time measurement is outside this range of expected values, either less than $T_1$ or greater than $T_2$, the bit cell time value output by the lookup table would then be the default value $C_{def}$.

It will be appreciated that what has been described is a simple and effective method of ensuring that data recorded in a camera on photographic film is recorded at bit cell lengths (times) that enhance to reliability and readability of the data even when an invalid film transport velocity measurement would otherwise result in recorded bit cell lengths that that would cause too high a bit density for accurate reading or loss of data if too long a bit cell length were set.

The invention has been described in detail with particular reference to certain preferred embodiments thereof, but it will be understood that variations and modifications can be effected within the spirit and scope of the invention.

| PARTS LIST | |
|---|---|
| 10 | film strip |
| 12 | film gate |
| 14 | film cartridge |
| 16 | takeup spool |
| 18 | film receiving chamber |
| 20,21 | latent image frames |
| 22 | image frame area |
| 24 | film advance direction arrow |
| 26 | microprocessor |
| 28 | film drive motor |
| 30 | magnetic recording head |
| 32 | magnetic data track |
| 34,36 | optical sensor sensing regions |
| 40 | "A" perf leading edge |
| 42 | "A" perf trailing edge |
| 44 | "M'" perf trailing edge |
| CL | bit cell |
| CP | clock pulses |
| A,A' | anticipation perfs |
| M,M' | metering perfs |
| OSV | velocity sensor |
| OSM | metering sensor |

What is claimed is:

1. A method of setting bit cell length for magnetic recording of a digital data signal in a predetermined length of recording track on photographic film strip within a camera, the data signal having up to a preselected maximum number of data bits, and the camera having apparatus for measuring film transport velocity upon initiation of film advance and for setting a bit cell length in response to said measured velocity; the method comprising the steps of:

initiating film advance after capture of an image on the film;

sensing, during an initial stage of film advance, a condition related to film advance which is indicative that said measured film transport velocity is invalid for use in setting bit cell length for data recording; and setting a default bit cell length when said sensed condition indicates said measured film transport velocity is invalid for use in setting bit cell length, said default bit cell length being sufficiently short to ensure recording of all the data signal in said predetermined length of recording track for a predefined maximum film transport velocity.

2. The method of claim 1 wherein said reference feature is a perforation in the film, the method further includes the step of providing an optical sensor in the camera for detecting said film perforation; said sensing step comprises determining the film transport velocity by measuring time of passage of the film perforation past the optical sensor and further includes comparison of said measured time of passage of the film perforation with a plurality of threshold values sorted according to at least one of temperature and battery voltage parameters for determination of whether an invalid measured film velocity exists for which said default bit cell length is to be set.

3. The method of claim 1 wherein said sensing step senses a condition indicative of position of the film within a film gate in the camera just prior to initiation of the film advance.

4. The method of claim 3 wherein said sensing step comprises sensing an initial position of a reference feature on the film within said film gate; and said default bit cell length is set when said sensed initial position of the film reference feature indicates improper position of the film in the film gate.

5. The method of claim 4 wherein said reference feature is a perforation in the film; the method further includes the step of providing an optical sensor in the camera for detecting said film perforation; said sensing step comprises determining film transport velocity by measuring time of passage of the film perforation past the optical sensor; and said default bit cell length is set when said determined film transport velocity is outside a range of normal velocities such that said determined film transport velocity is determined to be an invalid velocity for use in setting bit cell length.

6. The method of claim 5 further including the step of determining relative location within the film strip of a portion of the film strip on which the data is to be recorded and said range of normal velocities is adjusted in response to said determined relative location and said adjusted range of velocities is used in determining validity of the determined film transport velocity.

7. The method of claim 4 wherein said reference feature is a perforation in the film; the method further including the step of providing an optical sensor in the camera for detecting said film perforation; and said sensing step comprises determining relative position of said perforation to said optical sensor upon initiation of said film advance.

8. The method of claim 3 wherein said improper position is indicated by a sensed alignment of the film perforation with said optical sensor upon initiation of said film advance.

9. The method of claim 7 wherein proper position of said film corresponds to a predetermined initial spacing between said perforation and said optical sensor and said improper position is indicated by sensing passage of said perforation past said sensor in less than a predetermined delay time after initiation of said film advance, said predetermined delay time being representative of said proper spacing between said perforation and said optical sensor.

\* \* \* \* \*